US 8,630,285 B2

(12) United States Patent
Zheng

(10) Patent No.: US 8,630,285 B2
(45) Date of Patent: Jan. 14, 2014

(54) METHOD, SYSTEM, AND APPARATUS FOR TRANSMITTING IPV6 MESSAGE IN PASSIVE OPTICAL NETWORK

(75) Inventor: Ruobin Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 3 days.

(21) Appl. No.: 13/278,530

(22) Filed: Oct. 21, 2011

(65) Prior Publication Data

US 2012/0033967 A1 Feb. 9, 2012

Related U.S. Application Data

(63) Continuation of application No. PCT/CN2010/071867, filed on Apr. 19, 2010.

(30) Foreign Application Priority Data

Apr. 21, 2009 (CN) .......................... 2009 1 0135541

(51) Int. Cl.
*H04L 12/66* (2006.01)
(52) U.S. Cl.
USPC .......................................... 370/352; 370/392
(58) Field of Classification Search
None
See application file for complete search history.

(56) References Cited

U.S. PATENT DOCUMENTS

| | | | |
|---|---|---|---|
| 2007/0230956 A1* | 10/2007 | Ikeda et al. ...................... 398/71 |
| 2007/0274290 A1* | 11/2007 | Takahashi et al. ............. 370/351 |
| 2008/0165778 A1* | 7/2008 | Ertemalp ...................... 370/392 |
| 2008/0244090 A1 | 10/2008 | Zhu et al. |
| 2008/0253382 A1* | 10/2008 | Bachmann et al. ........... 370/400 |
| 2009/0047018 A1 | 2/2009 | Boyd et al. |
| 2009/0154492 A1* | 6/2009 | Diab et al. .................... 370/465 |
| 2009/0238111 A1* | 9/2009 | Hirano et al. ................. 370/328 |
| 2010/0080172 A1* | 4/2010 | Jin et al. ........................ 370/328 |
| 2010/0142521 A1* | 6/2010 | Evans et al. ................... 370/389 |
| 2010/0315973 A1* | 12/2010 | Hirano et al. ................. 370/254 |

FOREIGN PATENT DOCUMENTS

| | | |
|---|---|---|
| CN | 1897589 A | 1/2007 |
| CN | 101034938 A | 9/2007 |
| CN | 101325798 A | 12/2008 |
| EP | 1909452 A1 | 4/2008 |

OTHER PUBLICATIONS

Written Opinion of the International Searching Authority issued in corresponding PCT Patent Application No. PCT/CN2010/071867, mailed Jul. 29, 2010.

(Continued)

*Primary Examiner* — Phirin Sam
(74) *Attorney, Agent, or Firm* — Brinks Hofer Gilson & Lione

(57) ABSTRACT

Embodiments of the present disclosure provide a method for transmitting an Internet Protocol version 6 (IPv6) message in a Passive Optical Network (PON). The method includes: receiving a Router Advertisement (RA) message comprising Optical Line Terminal (OLT) port information, Optical Network Unit (ONU) port information, and an IPv6 address prefix; binding the IPv6 address prefix with an OLT port indicated by the OLT port information; and sending the RA message to an ONU through the OLT port, so that the ONU binds the IPv6 address prefix with an ONU port indicated by the ONU port information and provides the RA message for a user terminal through the ONU port. Embodiments of the present disclosure further disclose a PON system and an apparatus for transmitting an IPv6 message in a PON.

13 Claims, 4 Drawing Sheets

(56) References Cited

OTHER PUBLICATIONS

International Search Report issued in corresponding PCT Patent Application No. PCT/CN2010/071867, mailed Jul. 29, 2010.
Krishnan et al., "Line Identification in IPv6 Router Solicitation Messages" 6man Working Group. Internet Draft, Oct. 27, 2008.
Office Action issued in corresponding Chinese Patent Application No. 200910135541.4, mailed Apr. 9, 2013.
Extended European Search Report issued in corresponding European Patent Application No. 10766619.0, mailed Nov. 16, 2012.
Angelopoulos et al., "Dynamic Address Resolution for Enhanced Configurability in Packet-Based TDMA GPONS" Information Sciences vol. 77, 2007.
Determination of Allowance issued in corresponding Japanese Patent Application No. 2012-506320; mailed Sep. 11, 2012.
Allowed claims from corresponding Japanese Patent Application No. 2012-506320 (including computer generated English translation).
Office Action issued in corresponding European Patent Application No. 10 766 619.0; issued Jul. 8, 2013.

* cited by examiner

METHOD, SYSTEM, AND APPARATUS FOR TRANSMITTING IPV6 MESSAGE IN PASSIVE OPTICAL NETWORK

This application is a continuation of International Application No. PCT/CN2010/071867, filed on Apr. 19, 2010, which claims priority to Chinese Patent Application No. 200910135541.4, filed on Apr. 21, 2009, both of which are hereby incorporated by reference in their entireties.

FIELD

The present disclosure relates to the field of communications technologies, and in particular, to a method, a system, and an apparatus for transmitting an Internet Protocol version 6 (IPv6) message in a Passive Optical Network (PON).

BACKGROUND

At present, the PON, as a broadband optical access technology, usually uses a Point to Multi-Point (P2MP) topology. The PON includes an Optical Line Terminal (OLT), an Optical Distribution Network (ODN), and one or more Optical Network Units (ONUs). The OLT is located in a central office and connected to a service network through a service network interface, and implements access of multiple services according to a certain format. The ONU is located at a customer premise, and mainly implements service multiplexing/demultiplexing and user network interface functions. The ODN provides shared optical transmission media for a physical connection between the OLT and the ONU, uses a passive optical splitter to form a tree topology, and implement transparent transmission of a service. The ONU may also provide a Digital Subscriber Line (DSL) or an Ethernet (ETH) interface to connect a Residential Gateway (RG).

In IPv6, different DSLs usually use different IPv6 address prefixes. If a PON user adopts stateless address allocation, after receiving a Router Solicitation (RS) message sent by the user, a network entity Broadband Network Gateway (BNG) broadcasts a Router Advertisement (RA) message in all drop fibers in the PON, and then broadcasts the RA message through all DSLs to notify the user of an IPv6 address prefix allocated to the user. The RS message carries information about the IPv6 address prefix requested by the user, and the RA message carries the IPv6 address prefix allocated by the network entity to the user.

In the prior art, the network entity allocates an IPv6 address prefix to the user, and the IPv6 address prefix requested by each user is delivered through broadcast. That is, the user may receive all IPv6 address prefixes delivered by the network. Therefore, the user cannot determine the IPv6 address prefix delivered by the network for the user. Because different users require different IPv6 address prefixes to configure IP addresses, user IP addresses are configured in confusion.

SUMMARY

Therefore, it is necessary to provide a method, a PON system, an OLT and an ONU for transmitting an IPv6 message in a PON, so that a user terminal can communicate with a network entity through a specified port to obtain a specified IPv6 address prefix.

An embodiment of the present disclosure provides a method for transmitting an IPv6 message in a PON. The method includes: receiving an RA message comprising OLT port information, ONU port information, and an IPv6 address prefix; binding the IPv6 address prefix with an OLT port indicated by the OLT port information; and sending the RA message to an ONU through the OLT port, so that the ONU binds the IPv6 address prefix with an ONU port indicated by the ONU port information.

An embodiment of the present disclosure provides another method for transmitting an IPv6 message in a PON. The method includes: receiving an RA message from an OLT, where the RA message comprises ONU port information and an IPv6 address prefix that is bound with a predetermined OLT port; binding the IPv6 address prefix with an ONU port indicated by the ONU port information according to the ONU port information; and sending the RA message to a user terminal through the ONU port.

An embodiment of the present disclosure provides a PON system. The PON system includes: an OLT, configured to: receive an RA message comprising OLT port information, ONU port information, and an IPv6 address prefix, bind the IPv6 address prefix with an OLT port indicated by the OLT port information, and send the RA message to an ONU through the OLT port; and the ONU, configured to bind the IPv6 address with an ONU port indicated by the ONU port information.

An embodiment of the present disclosure provides an OLT. The OLT includes: an RA receiving unit, configured to receive an RA message comprising OLT port information, ONU port information, and an IPv6 address prefix; a binding unit, configured to bind the IPv6 address prefix with an OLT port indicated by the OLT port information; and an RA sending unit, configured to send the RA message to an ONU through the OLT port, instructing the ONU to bind the IPv6 address prefix with an ONU port indicated by the ONU port information.

An embodiment of the present disclosure provides an ONU. The ONU includes: an RA receiving unit, configured to receive an RA message from an OLT, where the RA message comprises ONU port information and an IPv6 address prefix that is bound with a predetermined OLT port; a binding unit, configured to bind the IPv6 address prefix with an ONU port indicated by the ONU port information; and an RA sending unit, configured to send the RA message to a user terminal through the ONU port.

By using the foregoing method, system, and apparatus for transmitting an IPv6 message in a PON, the OLT/ONU port indicated by the OLT/ONU port information is bound with the IPv6 address prefix, and the IPv6 address prefix is sent to the user through the OLT/ONU port, which enables the user terminal to communicate with the network entity on the specified port. In embodiments of the present disclosure, the specified IPv6 address prefix is obtained through the OLT/ONU port indicated by the OLT/ONU port information, which ensures configuration correctness of a user IP address. In addition, the user terminal obtains the specified IPv6 address prefix only through a port indicated by port information, without receiving IPv6 address prefixes of all users, which greatly saves user resources.

DETAILED DESCRIPTION OF THE EMBODIMENTS

The following describes a method, a system, and an apparatus for transmitting an IPv6 message in a PON in detail with reference to the accompanying drawings.

Figure 1:
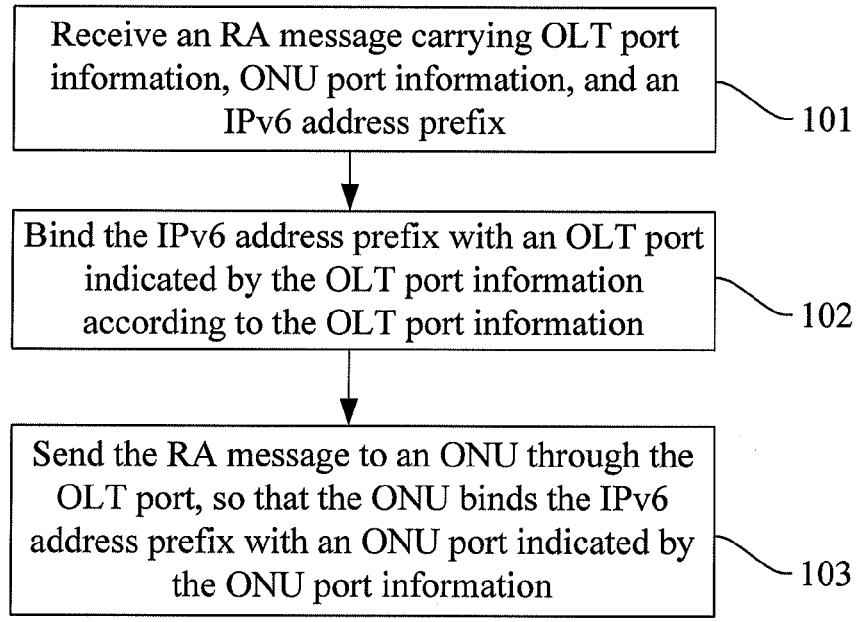
FIG. 1 is a flowchart of a method for transmitting an IPv6 message in a PON according to an embodiment of the present disclosure.

FIG. 1 is a flowchart of a method for transmitting an IPv6 message in a PON according to an embodiment of the present disclosure. The method includes the following steps:

101: An OLT receives an RA message carrying OLT port information, ONU port information, and an IPv6 address prefix.

102: The OLT binds the IPv6 address prefix with an OLT port indicated by the OLT port information.

103: The OLT sends the RA message to an ONU through the OLT port, so that the ONU binds the IPv6 address prefix with an ONU port indicated by the ONU port information.

Further, the ONU may send the RA message to a user through the ONU port for the user to generate an IPv6 address.

To ensure security of port information, in an embodiment, the OLT may remove the OLT port information from the RA message before sending the RA message to the ONU; and the ONU further removes the ONU port information from the RA message before forwarding the RA message to the user. In another embodiment, the OLT may not process the OLT port information in the RA message before sending the RA message to the ONU, while the ONU may remove both the OLT port information and the ONU port information from the RA message before forwarding the RA message to the user.

The ONU port information in the RA message may be carried in Option1 of the RA message, or the ONU port information may be carried in Option1 of an IPv6 extension header of an IPv6 packet corresponding to the RA message, where:

(1) when the ONU uses a port based on the Asynchronous Transfer Mode (ATM) (for example, an ATM-based DSL port), a port information format Option1 in the RA message may be ONU-ID atm slot2/port2:vpi.vci;

(2) when the ONU uses an ETH-based port (for example, an ETH-based DSL port), the port information format Option1 in the RA message may be ONU-ID eth slot2/port2[:vlan-id].

ONU-ID is an ONU identifier (ID), and slot2/port2 is a slot number and a port number on the ONU. In another embodiment, slot2/port2 may be replaced by other IDs on the ONU, for example, at least any combination of the following: cabinet number, rack number, subrack number, slot number, subslot number, and port number of the ONU.

vpi.vci is a virtual path ID and a virtual channel ID on a DSL.

In addition, generally for the ONU port, vlan-id is a Customer Virtual Local Area Network (C-VLAN) ID, and is used to identify a user or an access line and usually added or removed by the ONU. The description of vlan-id in the following Option1 format is similar to the preceding description and therefore is not provided again.

The OLT port information in the RA message may be carried in Option2 of the RA message, or the OLT port information may be carried in Option2 of the IPv6 extension header of the IPv6 packet corresponding to the RA message, where an Option2 format is Access-Node-Identifier slot1/port1[:vlan-id].

Access-Node-Identifier is an OLT ID, and slot1/port1 is a slot number and a port number on the OLT. In another embodiment, slot1/port1 may be replaced by other IDs on the OLT, for example, at least any combination of the following: cabinet number, rack number, subrack number, slot number, subslot number, and port number of the OLT.

Generally, for the OLT port, vlan-id is a Service VLAN (S-VLAN) ID, and is used to identify a service or an OLT and generally added or removed by the OLT. The description of vlan-id in the following Option2 format is similar to the preceding description and therefore is not provided again.

Both the OLT port information and the ONU port information in the RA message may be carried in Option3 of the RA message, or, be carried in Option3 of the IPv6 extension header of the IPV6 packet corresponding to the RA message, where an Option3 format may be as follows:

(1) when the ONU uses an ATM-based port, the port information format Option3 in the RA message may be Access-Node-Identifier atm slot1/port1/ONU-ID/slot2/port2:vpi.vci;

(2) when the ONU uses an ETH-based port, the port information format Option3 in the RA message may be Access-Node-Identifier eth slot1/port1/ONU-ID/slot2/port2[:vlan-id].

For meanings of Access-Node-Identifier, slot1/port1, ONU-ID, slot2/port2, and vpi.vci, see the preceding description. vlan-id is a VLAN ID, and may include a C-VLAN ID and an S-VLAN ID.

Multiple IPv6 extension headers may be carried between an IPv6 packet header and a piece of application layer information; each IPv6 extension header includes a Next Header field, which identifies a type of an IPv6 extension header or an application layer protocol immediately following the IPv6 extension header. When the IPv6 extension header is used to carry port information, the Next Header field of the corresponding IPv6 packet header should assert that the IPv6 extension header subsequently carried is used to carry port information; each IPv6 packet may use an IPv6 extension header to carry port information, or the port information may be added only when an Internet Control Message Protocol (ICMP) packet is forwarded. The ICMP packet may be an RS/RA message, or a Neighbor Solicitation (NS)/Neighbor Advertisement (NA) message.

When each IPv6 packet uses an IPv6 extension header to carry port information, the case is similar to use of a Point-to-Point Protocol over Ethernet (PPPoE) packet to carry port information for authentication or authorization.

Benefits of using the IPv6 extension header to carry port information are as follows: When an ICMP packet (such as RS/RA and NS/NA) carrying a signature is forwarded, because the port information is inserted in the IPv6 extension header rather than the ICMP packet, it is unnecessary to modify the ICMP packet, which does not affect validity of an ICMP packet signature.

In addition, it should be noted that "[ ]" in the Option1, Option2, and Option3 formats is optional.

To better describe the embodiments of the present disclosure, the following describes a method for transmitting an IPv6 message in a PON in detail.

Figure 2:
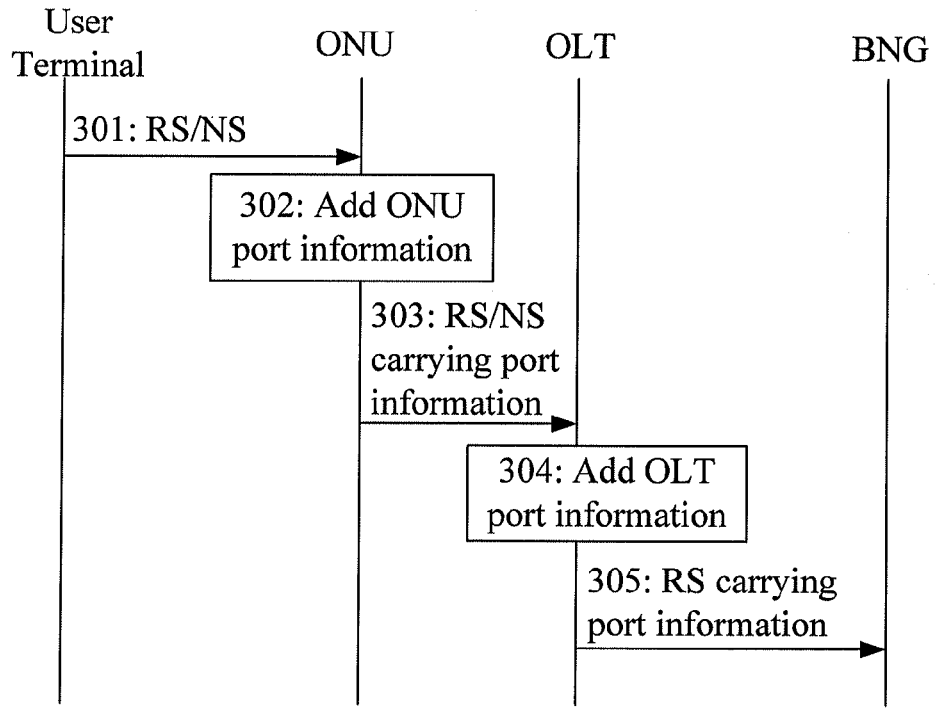
FIG. 2 is a signaling flowchart for a user using a user terminal to request an IPv6 address prefix from a network entity according to an embodiment of the present disclosure.

As shown in FIG. 2, when a user using a user terminal requests an IPv6 address prefix from a network entity through a PON, a specific implementation process is as follows:

301: The user terminal initiates an RS message, requesting an IPv6 address prefix.

The RS message may carry a Media Access Control (MAC) address and a Link-Local Address (LLA) of the user. In this step, the user may also request an IPv6 address prefix by initiating an NS message.

302: An ONU adds port information to a received RS/NS message.

The port information may be: ONU port information, or ONU port information and OLT port information.

When the port information is ONU port information, the ONU adds its own port information to Option1 of the RS/NS message, or, the ONU port information may be carried in Option1 of an IPv6 extension header of an IPv6 packet corresponding to the RS/NS message, where:

(1) when the ONU uses an ATM-based port, an Option1 information format may be ONU-ID atm slot2/port2:vpi.vci;

(2) when the ONU uses an ETH-based port, the Option1 information format may be ONU-ID eth slot2/port2[:vlan-id].

If the ONU receives OLT port information that is sent by an OLT through an ONU Management and Control Interface (OMCI) or by a BNG over a Layer 2 Control Protocol (L2CP) before adding port information, the ONU may add not only the ONU port information but also the OLT port information to the RS message.

Specifically, in an embodiment, the ONU may add the ONU port informatio Option1 of the RS/NS message and add the OLT port information to Option2 of the RS/NS message, or, the ONU port information and the OLT port information may by added by the ONU and the OLT to Option1 and Option2 of the IPv6 extension header of the IPv6 packet corresponding to the RS/NS message respectively. An Option2 message format may be Access-Node-Identifier slot1/port1[:vlan-id].

In another embodiment, the ONU may also add both the ONU port information and the OLT port information to Option3 of the RS/NS message, or, both the ONU port information and the OLT port information may be added to Option3 of the IPv6 extension header of the IPv6 packet corresponding to the RS/NS message, where:

(1) when the ONU uses an ATM-based port, an Option3 information format may be Access-Node-Identifier atm slot1/port1/ONU-ID/slot2/port2:vpi.vci;

(2) when the ONU uses an ETH-based port, the Option3 information format may be Access-Node-Identifier eth slot1/port1/ONU-ID/slot2/port2[:vlan-id].

Further, in step 302, the ONU also obtains the MAC address of the user from the received RS/NS message and stores the MAC address.

303: The ONU sends the RS/NS message carrying port information to the OLT.

304: The OLT adds the OLT port information to the received RS/NS message.

It should be noted that step 304 is optional. If the ONU in step 302 already adds complete port information, that is, the ONU port information and the OLT port information, to the RS/NS message, step 304 may be omitted and step 305 is executed directly. In step 302, if the ONU uses the port information format of Option to add the ONU port information to the RS/NS message, but adds no OLT port information, in step 304, the OLT needs to add the OLT port information to the RS/NS message.

Specifically, in an embodiment, the OTL may add the OTL port information to Option2 of the RS message, or, the OLT port information may be carried in Option2 of the IPv6 extension header of the IPv6 packet corresponding to the RS/NS message, where an information format is Access-Node-Identifier slot1/port1[:vlan-id].

In another embodiment, alternatively, if the ONU in step 302 uses the port information format of Option3 to add the ONU port information to the RS/NS message or to the IPv6 extension header of the IPv6 packet corresponding to the RS/NS message, but adds no OLT port information, the OLT in step 304 may add the OLT port information to the RS/NS message or to the IPv6 extension header of the IPv6 packet corresponding to the RS/NS message by modifying Option3. For example, the OLT may obtain the ONU port information carried in Option3, and then combine the OLT port information and the ONU port information into a complete port information format Option3, and finally add Option3 again to the RS/NS message or to the IPv6 extension header of the IPv6 packet corresponding to the RS/NS message.

Further, in step 304, the OLT also obtains the MAC address of the user from the received RS/NS message and stores the MAC address.

305: The OLT forwards the RS/NS message carrying the ONU port information and the OLT port information to the network entity (such as the BNG).

After receiving the RS/NS message, the BNG may query a user name and/or a password corresponding to the port information according to the port information carried in the RS/NS message, namely, the ONU port information and the OLT port information, and initiate an Access Request message carrying the user name and the password to an Authentication, Authorization And Accounting (AAA) server. The AAA server may further authenticate the user and/or search for a corresponding IPv6 address prefix according to the port information. After the user is authenticated successfully, the AAA server may deliver a user profile to the BNG through an Access Accept message, where the user profile may include an IPv6 address prefix allocated to the user. Alternatively, the BNG may also directly initiate an Access Request message carrying an RS message to the AAA server, and the AAA server may further authenticate the user and/or search for the corresponding IPv6 address prefix according to the port information, and deliver the IPv6 address prefix to the BNG through the user profile.

Further, after receiving the user profile delivered by the AAA server through the Access Accept message, the BNG may deliver the IPv6 address prefix to the user through a PON system, where the IPv6 address prefix is carried in the RA message for transmission. Optionally, the BNG may also bind the MAC address of the user with the IPv6 address prefix, where the MAC address of the user may be obtained from the preceding RS/NS message or from a source MAC address of the RS message. In addition, the BNG may detect duplicate LLAs before performing binding.

Further, the BNG may also initiate delivery of the IPv6 address prefix according to the port information in the RS message. Specifically, when initiating delivery of the IPv6 address prefix, the BNG may directly perform identity authorization and a search by using stored user information, and deliver the corresponding IPv6 address prefix to the user through an RA message after obtaining the IPv6 address prefix.

Figure 3:
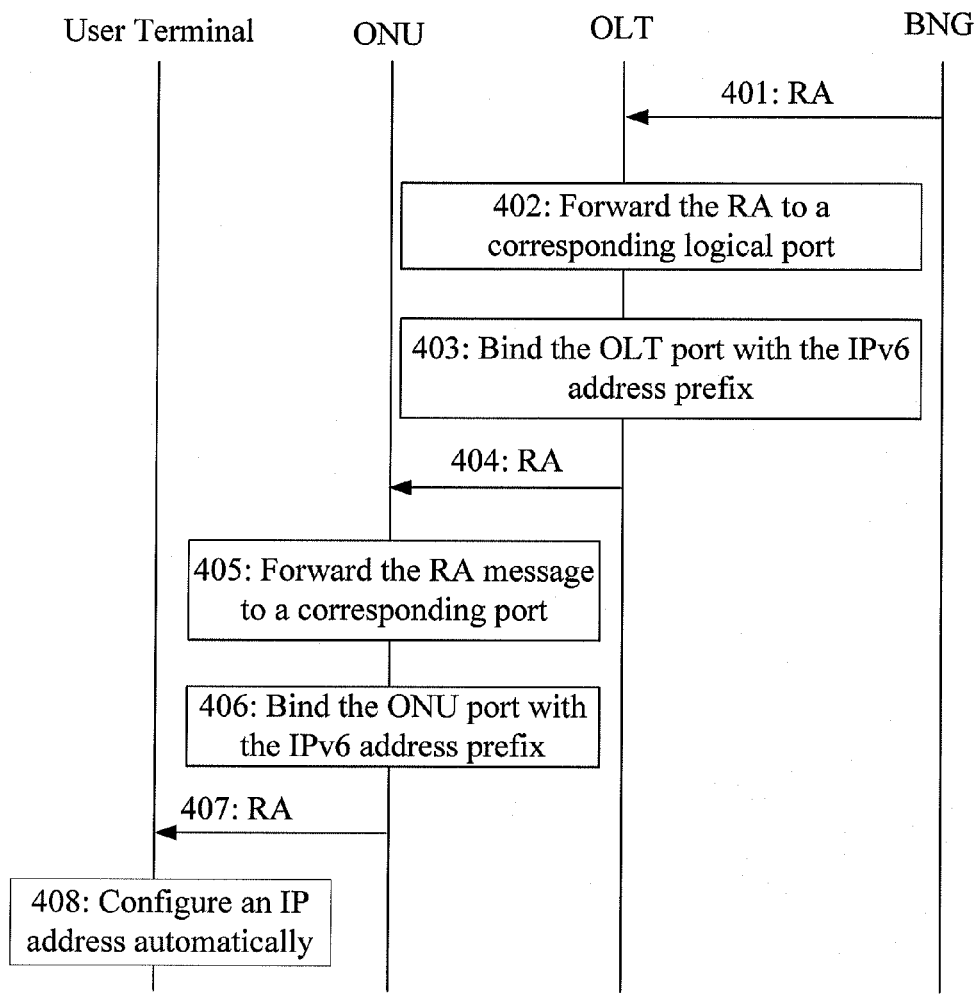
FIG. 3 is a signaling flowchart for a network entity to deliver an IPv6 address prefix to a user terminal according to an embodiment of the present disclosure.

The following describes the process of the network entity (such as the BNG) delivering an IPv6 address prefix to the user through an IPv6 message (such as an RA message) in detail with reference to FIG. 3:

401: The BNG sends an RA message to the OLT.

Specifically, the BNG may deliver the RA message in multicast or unicast mode. The RA message may carry information about an ONU port to which the user is connected, OLT port information, and a relevant IPv6 address prefix, and an ONU port information format and an OLT port information format are the same as the port information format carried in the preceding RS message. Further, an ONU port information type ID is consistent with the type ID "atm/eth" of the ONU port information in the RS message, or may be determined by an ONU port type in the user profile delivered by the AAA server.

402: The OLT receives the RA message, and forwards the RA message to a corresponding logical port according to the OLT port information and the ONU port information carried in the RA message.

For example, in a Gigabit PON (GPON) system, the OLT maps the RA message to a logical link corresponding to a GEM PORT-ID to forward the message to a corresponding GPON Encapsulation Method (GEM) port; in an Ethernet PON (EPON) system, the OLT maps the RA message to a logical link corresponding to a Logical Link Identifier (LLID) to forward the message to a corresponding logical link port. Further, the logical port may forward the RA message in unicast mode. For example, in the GPON system, a unicast GEM port may be used to carry the RA message, or in the EPON system or an Ethernet system, a unicast MAC frame is used to carry the RA message.

403: The OLT binds an OLT port indicated by the OLT port information with the corresponding IPv6 address prefix according to the OLT port information carried in the RA message.

Alternatively, the OLT may also bind the IPv6 address prefix with the OLT port indicated by the OLT port information and an ONU port indicated by the ONU port information according to the OLT port information and the ONU port information carried in the RA message.

In addition, to ensure security and confidentiality of the OLT port, optionally, the OLT may further remove the OLT port information carried in the RA message, for example, remove the OLT port information in Option3 or remove Option2. Alternatively, the OLT may also not remove the OLT port information carried in the RA message, and the ONU removes the OLT port information carried in the RA message in a subsequent step.

404: The OLT forwards the RA message to a corresponding ONU.

For example, if the OLT already removes the OLT port information carried in the RA message before step 404, the RA message forwarded by the OLT to the ONU carries Option1 but does not carry Option2, or Option3 carried in the RA message includes only the ONU port information. If the OLT does not remove the OLT port information before step 404, the RA message forwarded by the OLT to the ONU may carry both Option1 and Option2, or complete Option3.

405: The ONU receives the RA message, and forwards the RA message to the port indicated by the ONU port information according to the ONU port information carried in the RA message.

Specifically, after receiving the RA message, the ONU may check whether the type ID "atm/eth" in the ONU port information carried in the RA message matches an actual port type Atm/Eth. If the type ID "atm/eth" in the ONU port information carried in the RA message matches the actual port type Atm/Eth, the ONU forwards the RA message to the corresponding ONU port. If the type ID "atm/eth" in the ONU port information carried in the RA message does not match the actual port type Atm/Eth, the ONU discards the RA message; further, the ONU may notify the OLT or the BNG through the OMCI or the L2CP to unbind the OLT port on the OLT from the IPv6 address prefix or unbind the OLT and ONU port information from the corresponding IPv6 address prefix.

406: The ONU binds the ONU port with the corresponding IPv6 address prefix.

Specifically, if the type ID "atm/eth" in the ONU port information carried in the RA message matches the actual port type Atm/Eth, the ONU may further bind the IPv6 address prefix with the corresponding ONU port according to the ONU port information and the IPv6 address prefix.

In addition, to ensure security and confidentiality of the ONU port, optionally, the ONU removes the ONU port information from the RA message after binding the ONU port indicated by the ONU port information with the IPv6 address prefix, for example, remove Option1 from the RA message or remove the ONU port information from Option3. It should be noted that if the OLT does not remove the OLT port information in the preceding step, the ONU may remove the OLT port information while removing the ONU port information.

407: The ONU uses the ONU port to forward the RA message to a corresponding user, that is, provide the IPv6 address prefix for the user.

408: The user terminal automatically configures an IP address according to the IPv6 address prefix carried in the RA message.

According to the method provided in embodiments of the present disclosure, the OLT and the ONU bind the OLT port and the ONU port with the IPv6 address prefix respectively in the process of forwarding the RA message carrying the IPv6 address prefix to the user terminal. In this way, communication between the user terminal and the network entity is implemented on a specified port. Compared with the prior art, the method provided in embodiments of the present disclosure may obtain a specified IPv6 address prefix through a bound port, which ensures configuration correctness of a user IP address. In addition, because the user obtains the specified IPv6 address prefix through the bound port and avoid receiving IPv6 address prefixes of other users, user resources are saved greatly.

Figure 4:
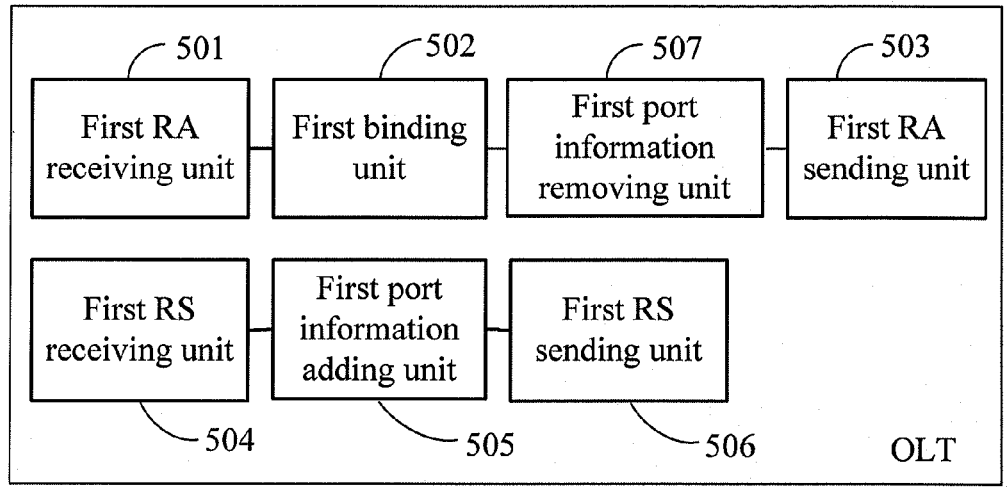
FIG. 4 is a schematic structural diagram of an OLT according to an embodiment of the present disclosure.

As shown in FIG. 4, an embodiment of the present disclosure provides an apparatus for transmitting an IPv6 message in a PON. The apparatus is a network side apparatus and may be an OLT. The apparatus may include:

a first RA receiving unit 501, configured to receive an RA message carrying OLT port information, ONU port information, and an IPv6 address prefix, where the RA message may be delivered by a network side device (such as a BNG or an AAA server) according to a user request;

a first binding unit 502, configured to bind the IPv6 address prefix with an OLT port indicated by the OLT port information; and a first RA sending unit 503, configured to send the RA message to an ONU through the OLT port, instructing the ONU to bind the IPv6 address prefix with an ONU port indicated by the ONU port information.

Further, the OLT may include: a first port information removing unit 507, configured to remove the OLT port information from the RA message and provide the RA message without the OLT port information for the first RA sending unit 503 so that the RA message is sent to the ONU. It should be noted that the first port information removing unit 507 is optional. In addition, in another embodiment, a function of the first port information removing unit 507 may be integrated in the first binding unit 502.

Further, the OLT may include:

a first RS receiving unit 504, configured to receive an RS message that is sent by the ONU and carries the ONU port information, where the RS message may be initiated by a user and forwarded by the ONU and the ONU adds the ONU port information to the RS message before forwarding the RS message to the OLT;

a first port information adding unit 505, configured to add the OLT port information to the RS message received by the RS receiving unit 504; and a first RS sending unit 506, configured to send the RS message carrying the ONU port information and the OLT port information to a network entity, requesting the network entity to allocate an IPv6 address prefix for the user.

It should be noted that the first port information adding unit 505 is optional; alternatively, in another embodiment, the OTL may further include an OLT port information delivering unit (not shown in FIG. 4), which is configured to deliver the OLT port information to the ONU so that the ONU adds both the ONU port information and the OLT port information to the RS message before forwarding the RS message. In this case, the first port information adding unit 505 is optional in the OLT, while the RS message that is received by the first RS receiving unit 504 and forwarded by the ONU carries both the OLT port information and the ONU port information. Therefore, the first RS sending unit 506 may send the RS message carrying both the OLT port information and the ONU port information to the BNG to request an IPv6 address prefix without processing implemented by the first port information adding unit 505.

Further, the first RS receiving unit 504, the first port information adding unit 505 (or the OLT port information delivering unit), and the first RS sending unit 506 may be integrated into a functional module, such as a first RS relaying module (not illustrated in FIG. 4). That is, the first RS relaying module is configured to: receive an RS message that requests an IPv6 address prefix and carries the ONU port information, add the OLT port information to the RS message carrying the ONU port information, and send the RS message carrying the OLT port information and the ONU port information to a network entity (such as a BNG) through the port indicated by the OLT port information.

Figure 5:
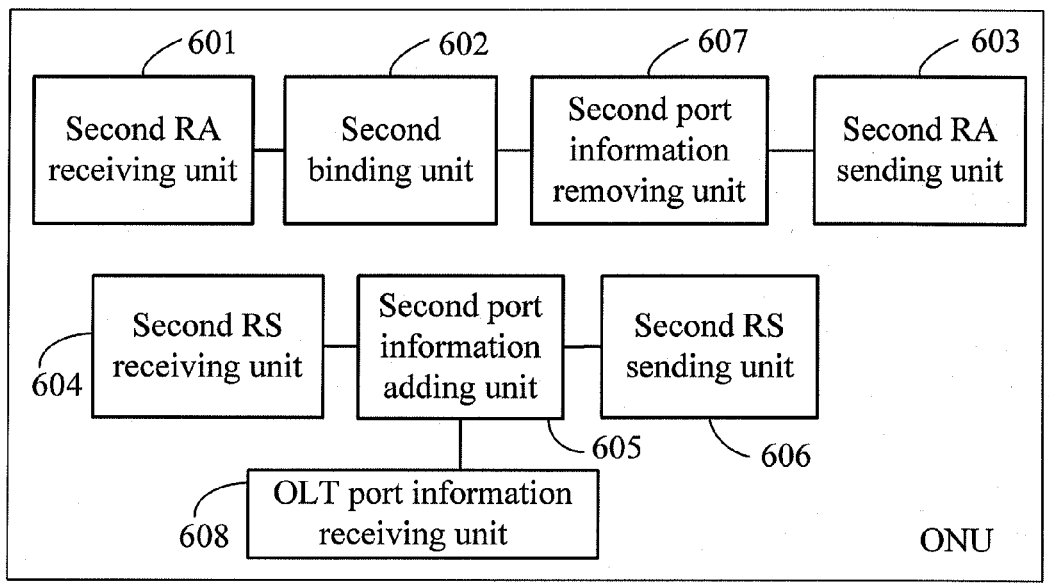
FIG. 5 is a schematic structural diagram of an ONU according to an embodiment of the present disclosure.

A shown in FIG. 5, an embodiment of the present disclosure shows an apparatus for transmitting an IPv6 message in a PON. The apparatus is located at a customer premise and may be an ONU. The apparatus may include:

a second RA receiving unit 601, configured to receive an RA message from an OLT, where the RA carries ONU port information and an IPv6 address prefix that is bound with a predetermined OLT port;

a second binding unit 602, configured to bind the IPv6 address prefix with an ONU port indicated by the ONU port information; and a second RA sending unit 603, configured to send the RA message to a user through the ONU port.

Further, the predetermined OLT port may be a port that is preset in the OLT and configured to forward the RA message to the ONU port, where the ONU port may be a port that is located in the ONU and configured to forward the RA message to the user.

Further, the ONU may include: a second port information removing unit 607, configured to remove the ONU port information from the RA message and provide the RA message without the ONU port information for the second RA sending unit 603 so that the RA message is sent to the user. It should be noted that the second port information removing unit 607 is optional and is mainly configured to ensure security of the ONU port. In addition, in another embodiment, the RA message received by the second RA receiving unit 601 may carry both OLT port information and the ONU port information. In this case, the second port information removing unit 607 may be configured to remove both the OLT port information and the ONU port information from the RA message.

Further, the ONU may include:

a second RS receiving unit 604, configured to receive an RS message initiated by a user;

an OLT port information receiving unit 608, configured to receive OLT port information that is delivered by the OLT beforehand;

a second port information adding unit 605, configured to add ONU port information to the RS message, or add both the OLT port information and the ONU port information to the RS message; and a second RS sending unit 606, configured to send the RS message carrying the ONU port information, or both the ONU port information and the OLT port information to the OLT, so that the OLT requests a network entity to allocate an IPv6 address prefix for the user.

Further, the second RS receiving unit 604, the OLT port information receiving unit 608, the second port information adding unit 605, and the second RS sending unit 606 may be integrated into a functional module, such as a second RS relaying module (not illustrated in FIG. 5). That is, the second RS relaying module is configured to: receive an RS message, add ONU port information (and OLT port information) to the RS message, and send the RS message to the OLT according to a port indicated by port information.

Figure 6:
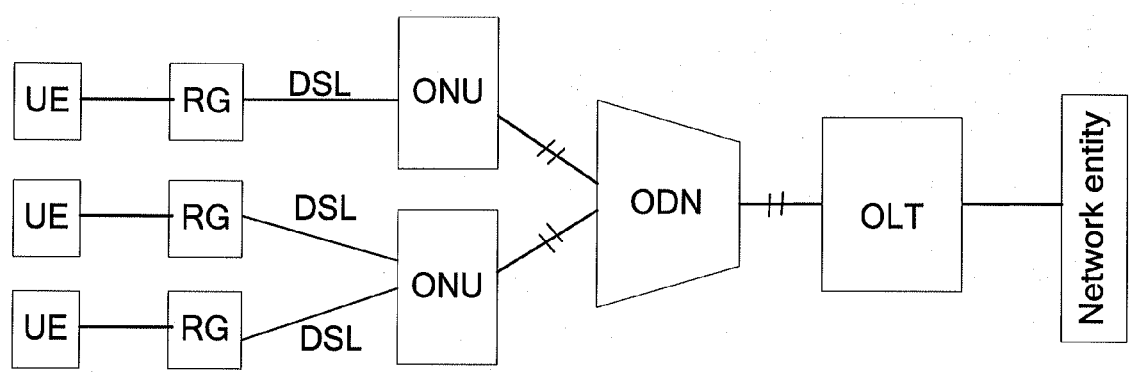
FIG. 6 is a schematic structural diagram of a PON system according to an embodiment of the present disclosure.

As shown in FIG. 6, an embodiment of the present disclosure provides a PON system. The system may include: a User Equipment (UE), an RG, an ONU, an ODN, an OLT, and a network entity, where: the network entity is connected to the OLT, the OLT is connected to the ONU through the ODN in P2MP mode, the ONU is connected to the UE through the RG, and each ONU may be connected to one or multiple RGs.

The UE is configured to send an RS/NS message for obtaining an IPv6 address prefix to the network entity through the RG.

The ONU may be the ONU illustrated in FIG. 5, and is configured to: receive the RS/NS message, add port information to the received RS/NS message, where the added port information may be only ONU port information or may be OLT port information and the ONU port information, and send the RS/NS message carrying the added port information to the OLT.

The OLT may be the OLT illustrated in FIG. 4, and is configured to: add the OLT port information to the RS/NS message according to the port information carried in the received RS/NS message, and then send the RS/NS message to the network entity; or directly send the RS/NS message to the network entity.

The network entity is configured to authenticate a user and search for the IPv6 address prefix according to received port information, and deliver a corresponding IPv6 address prefix to the OLT.

The OLT may be the OLT illustrated in FIG. 4, and is further configured to receive an RA message carrying OLT port information, ONU port information, and an IPv6 address prefix, bind the IPv6 address prefix with an OLT port indicated by the OLT port information, and send the RA message to the ONU through the OLT port.

The ONU may be the ONU illustrated in FIG. 5, and is further configured to bind the IPv6 address prefix with an ONU port indicated by the ONU port information, and provide the RA message for the UE through the ONU port.

The UE is further configured to generate an IPv6 address according to the IPv6 address prefix.

Persons of ordinary skill in the art may understand that all or part of steps of a method specified in any preceding embodiment may be implemented by a program instructing relevant hardware. The program may be stored in a computer readable storage medium such as a Read Only Memory or Random Access Memory (ROM/RAM), a magnetic disk, or a Compact Disk-Read Only Memory (CD-ROM). When the program is executed, steps of methods in the preceding embodiments are performed.

The preceding descriptions are merely exemplary embodiments of the present disclosure, but not intended to limit the protection scope of the present disclosure. Various variations or replacements made by persons skilled in the art without departing from the scope of technical disclosures of the present disclosure shall fall within the protection scope of the present disclosure. Therefore, the protection scope of the present disclosure is subject to the appended claims.

What is claimed is:

1. A method for transmitting an Internet Protocol version 6 (IPv6) message in a Passive Optical Network (PON), comprising:
   receiving, by an Optical Line Terminal (OLT), a Router Advertisement (RA) message carrying OLT port information, Optical Network Unit (ONU) port information, and an IPv6 address prefix;
   binding, by the OLT, the IPv6 address prefix with an OLT port indicated by the OLT port information;
   sending, by the OLT, the RA message to an ONU through the OLT port, so that the ONU binds the IPv6 address prefix with an ONU port indicated by the ONU port information; and
   further comprising one of the following:
   receiving a Router Solicitation (RS) message that is sent by the ONU and comprises the ONU port information, adding OLT port information to the RS message, and sending the RS message that comprises the ONU port information and the OLT port information to a network entity to request the network entity to allocate an IPv6 address prefix for a user terminal; and
   receiving an RS message that is sent by the ONU and comprises the OLT port information and the ONU port information, and forwarding the RS message to the network entity to request the network entity to allocate an IPv6 address prefix for the user terminal.

2. The method of claim 1, further comprising: before sending the RA message to the ONU, removing the OLT port information from the RA message.

3. A method for transmitting an Internet Protocol version 6 (IPv6) message in a Passive Optical Network (PON), comprising:
   receiving, by an Optical Network Unit (ONU), a Router Advertisement (RA) message from an Optical Line Terminal (OLT), wherein the RA message comprises ONU port information and an IPv6 address prefix that is bound with a predetermined OLT port;
   binding, by the ONU, the IPv6 address prefix with an ONU port indicated by the ONU port information;
   sending, by the ONU, the RA message to a user terminal through the ONU port;
   receiving a Router Solicitation (RS) message initiated by the user terminal;
   adding the ONU port information, or the ONU port information and the OLT port information that is delivered by the OLT beforehand to the RS message; and
   sending the RS message that comprises the ONU port information, or the ONU port information and the OLT port information to the OLT, so that the OLT requests a network entity to allocate an IPv6 address prefix for the user terminal.

4. The method of claim 3, further comprising: before sending the RA message to the user terminal, removing the ONU port information from the RA message.

5. The method of claim 3, wherein the RA message further comprises OLT port information corresponding to the predetermined OLT port, and the method further comprises:
   before sending the RA message to the user terminal, removing the ONU port information and the OLT port information from the RA message.

6. An Optical Line Terminal (OLT), comprising:
   a Router Advertisement (RA) receiving unit, configured to receive an RA message comprising OLT port information, Optical Network Unit (ONU) port information, and an Internet Protocol version 6 (IPv6) address prefix;
   a binding unit, configured to bind the IPv6 address prefix with an OLT port indicated by the OLT port information;
   an RA sending unit, configured to send the RA message to an ONU through the OLT port, notifying the ONU to bind the IPv6 address prefix with an ONU port indicated by the ONU port information; and
   a port information removing unit, configured to remove the OLT port information from the RA message and provide the RA message without the OLT port information for the RA sending unit so that the RA message is sent to the ONU.

7. The OLT of claim 6, further comprising:
   a Router Solicitation (RS) receiving unit, configured to receive an RS message that is sent by a user terminal through the ONU and comprises the ONU port information;
   a port information adding unit, configured to add the OLT port information to the RS message received by the RS receiving unit; and
   an RS sending unit, configured to send the RS message comprising the ONU port information and the OLT port information to a network entity, requesting the network entity to allocate an IPv6 address prefix for the user terminal.

8. The OLT of claim 6, further comprising:
   a Router Solicitation (RS) receiving unit, configured to receive an RS message that is sent by a user terminal through the ONU and comprises the ONU port information and the OLT port information; and
   an RS sending unit, configured to send the RS message comprising the ONU port information and the OLT port information to a network entity, requesting the network entity to allocate an IPv6 address prefix for a user terminal.

9. An Optical Network Unit (ONU), comprising:
   a Router Advertisement (RA) receiving unit, configured to receive an RA message from an Optical Line Terminal (OLT), wherein the RA message comprises ONU port information and an Internet Protocol version 6 (IPv6) address prefix that is bound with a predetermined OLT port;
   a binding unit, configured to bind the IPv6 address prefix with an ONU port indicated by the ONU port information;
   an RA sending unit, configured to send the RA message to a user terminal through the ONU port; and
   a port information removing unit, configured to remove the ONU port information from the RA message and provide the RA message without the ONU port information for the RA sending unit so that the RA message is sent to the user terminal.

10. The ONU of claim 9, further comprising:
a Router Solicitation (RS) receiving unit, configured to receive an RS message initiated by the user terminal;
a port information adding unit, configured to add port information to the RS message; and an RS sending unit, configured to send the RS message comprising the port information to the OLT, so that the OLT requests a network entity to allocate an IPv6 address prefix for the user terminal.

11. An Optical Line Terminal (OLT), comprising:
a Router Advertisement (RA) receiving unit, configured to receive an RA message comprising OLT port information, Optical Network Unit (ONU) port information, and an Internet Protocol version 6 (IPv6) address prefix;
a binding unit, configured to bind the IPv6 address prefix with an OLT port indicated by the OLT port information;
an RA sending unit, configured to send the RA message to an ONU through the OLT port, notifying the ONU to bind the IPv6 address prefix with an ONU port indicated by the ONU port information;
a Router Solicitation (RS) receiving unit, configured to receive an RS message that is sent by a user terminal through the ONU and comprises the ONU port information;
a port information adding unit, configured to add the OLT port information to the RS message received by the RS receiving unit; and
an RS sending unit, configured to send the RS message comprising the ONU port information and the OLT port information to a network entity, requesting the network entity to allocate an IPv6 address prefix for the user terminal.

12. An Optical Line Terminal (OLT), comprising:
a Router Advertisement (RA) receiving unit, configured to receive an RA message comprising OLT port information, Optical Network Unit (ONU) port information, and an Internet Protocol version 6 (IPv6) address prefix;
a binding unit, configured to bind the IPv6 address prefix with an OLT port indicated by the OLT port information;
an RA sending unit, configured to send the RA message to an ONU through the OLT port, notifying the ONU to bind the IPv6 address prefix with an ONU port indicated by the ONU port information;
a Router Solicitation (RS) receiving unit, configured to receive an RS message that is sent by a user terminal through the ONU and comprises the ONU port information and the OLT port information; and
an RS sending unit, configured to send the RS message comprising the ONU port information and the OLT port information to a network entity, requesting the network entity to allocate an IPv6 address prefix for a user terminal.

13. An Optical Network Unit (ONU), comprising:
a Router Advertisement (RA) receiving unit, configured to receive an RA message from an Optical Line Terminal (OLT), wherein the RA message comprises ONU port information and an Internet Protocol version 6 (IPv6) address prefix that is bound with a predetermined OLT port;
a binding unit, configured to bind the IPv6 address prefix with an ONU port indicated by the ONU port information;
an RA sending unit, configured to send the RA message to a user terminal through the ONU port;
a Router Solicitation (RS) receiving unit, configured to receive an RS message initiated by the user terminal;
a port information adding unit, configured to add port information to the RS message; and
an RS sending unit, configured to send the RS message comprising the port information to the OLT, so that the OLT requests a network entity to allocate an IPv6 address prefix for the user terminal.

* * * * *